Feb. 25, 1969 F. L. STOK 3,430,098

ARRANGEMENT FOR TESTING INFORMATION IN A PLURALITY OF TELEVISION SIGNALS

Filed Dec. 14, 1966 Sheet 1 of 2

INVENTOR.
FILIPPUS L. STOK
BY
Frank R. Trifari
AGENT

Feb. 25, 1969 F. L. STOK 3,430,098

ARRANGEMENT FOR TESTING INFORMATION IN A PLURALITY OF TELEVISION SIGNALS

Filed Dec. 14, 1966

INVENTOR.
FILIPPUS L. STOK
BY
AGENT 3,430,098

ARRANGEMENT FOR TESTING INFORMATION IN A PLURALITY OF TELEVISION SIGNALS

Filippus Leon Stok, Emmasingel, Eindhoven, Netherlands, assignor to North American Philips Co., Inc., New York, N.Y., a corporation of Delaware Filed Dec. 14, 1966, Ser. No. 601,687
Claims priority, application Netherlands, Dec. 18, 1965, 6516536
U.S. Cl. 315—24 3 Claims
Int. Cl. H01j 29/70; H04n 5/44, 5/14

ABSTRACT OF THE DISCLOSURE

A monitor system for television signals, especially color television signals, in which the signal components are applied to a display device, such as a cathode ray tube, so that signals corresponding to different colors appear as bars in adjacent zones of the display screen. The different color signals are gated to the display device at line frequency, and a stepwave having steps of line duration is added to the time base deflection of the display device.

This invention relates to arrangements for testing information in a plurality of television signals which information is incorporated in the signal in known manner in lines and fields, said arrangements controlling a cathode-ray tube having two deflection means for deflecting an electron ray in two relatively substantially perpendicular directions on a screen, the television signals being alternately fed to the first deflection means and a sawtooth signal being fed to the second deflection means.

In the known arrangement the three colour components of a colour television signal are successively fed through an electronic switch, each during one field period, to the first deflection means. By feeding to the second deflection means a sawtooth singal which writes a time-axis on the screen of the cathode-ray tube with a period equal to thrice the field period, the three colour components can be simultaneously observed on the screen of a cathode-ray tube. Thus, the frequency of the writing of the time-axis will be 16⅔ c./s. for a field frequency of 50 c./s. The brightness of the image written on the screen will now also vary with a frequency of 16⅔ c./s., so that a flicker picture appears on the screen which is unpleasant to the eye. If, in known devices, it is desired to observe the brightness component at the same time with the three colour components it is necessary to write the time-axis with a frequency of 12.5 c./s., so that a very annoying flicker picture appears on the screen.

An object of the invention is to provide the possibility to study simultaneously a plurality of television signals and more particularly the components of a colour television signal, but without troublesome flicker of the displayed image occurring. For this purpose, according to the invention the television signals are alternately fed each during one line period to the first deflection means and that the sawtooth signal fed to the second deflection means has the field frequency and has superimposed on it a periodical step-like signal having a number of levels equal to the number of television signals to be written on the screen, each level having a duration equal to one line period.

The arrangement according to the invention affords the important advantage that the frequency of the writing of the time-axis will invariably be the field frequency irrespectively of the number of television signals or components of a colour television signal which it is desired to reproduce on the screen, so that a flickerless picture is obtained at all times.

Figure 1:
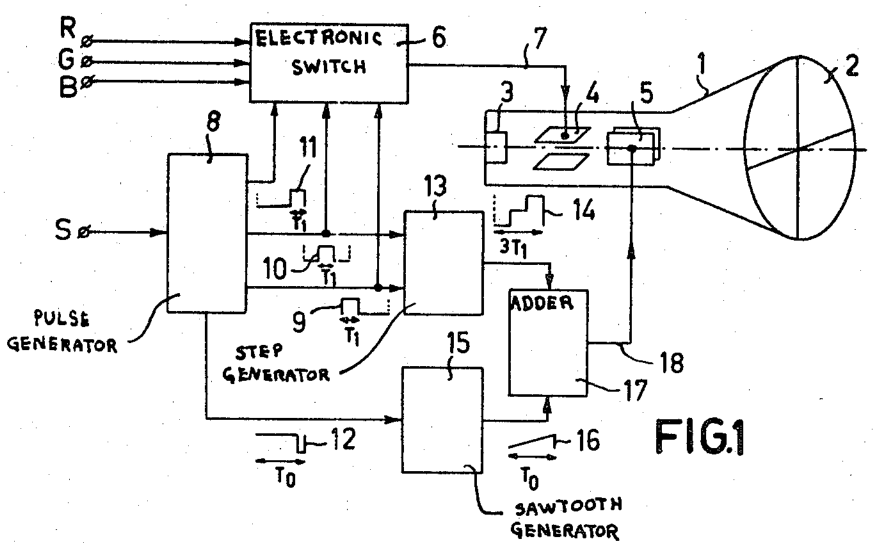
Figure 2:
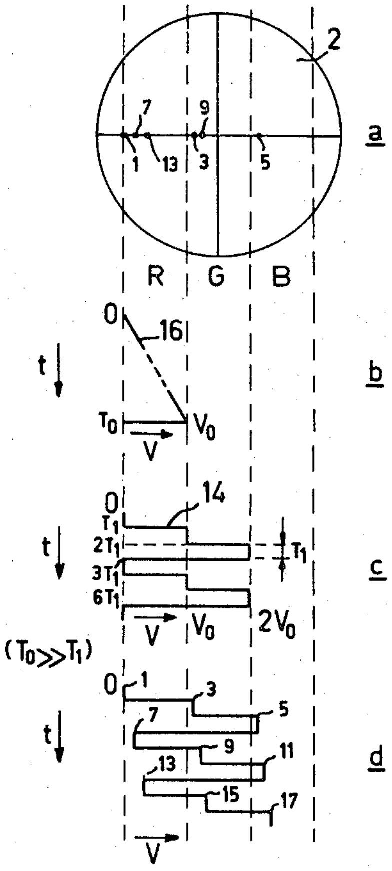

In order that the invention may be readily carried into effect, it will now be described in detail, by way of example, with reference to the accompanying diagrammatic drawings, in which:

FIG. 1 shows a block diagram of the circuit in the case of testing three colour components of a colour television signal;

FIG. 2 serves to clarify the principle of the invention and

Figure 3:
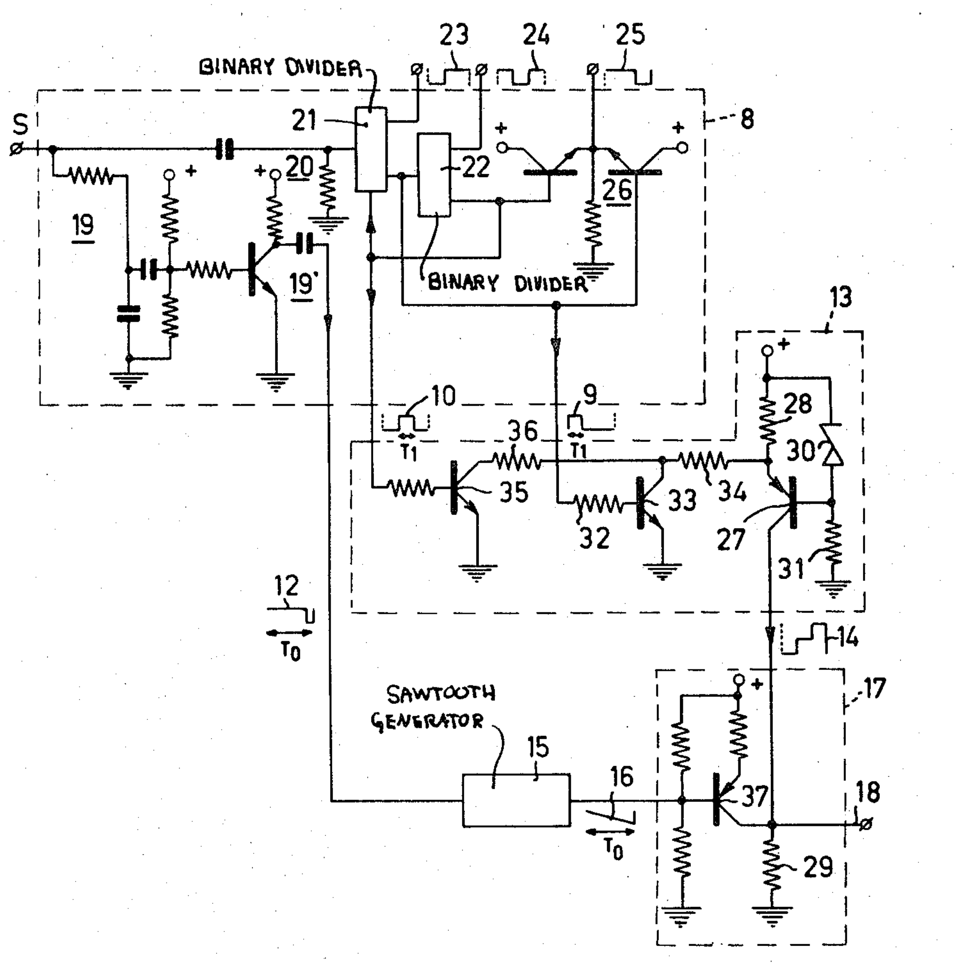

FIG. 3 shows one embodiment of a section of the circuit arrangement.

Referring to FIG. 1, in a cathode-ray tube 1, having a screen 2, an electron ray produced by an electron gun 3 is deflected by first and second deflection means 4 and 5 respectively. In this example, the deflection means 4 and 5 have the form of deflection plates which deflect the electron ray in the vertical and the horizontal direction respectively. However, a cathode-ray tube 1 having deflection coils instead of deflection plates may also serve in the arrangement according to the invention. The accelerating and focussing electrodes in cathode-ray tube 1 are not shown since they are irrelevant to the invention.

The red, green and blue colour components are applied to input terminals R, G and B respectively, and are alternately fed to the vertical deflection plates 4 by an electronic switch 6 through a lead 7 which includes an amplifier (not shown) if desired. An input terminal S receives a synchronizing signal which is fed to a pulse generator 8. The line and field synchronizing pulses may be separated in known manner from the colour television signal containing colour information and line and field-synchronizing pulses and then fed as the said synchronizing signal to the terminal S. At the camera end, the line and field synchronizing pulses may also be derived directly from the relevant source. Pulse generator 8 subsequently produces four pulse series. The pulse series 9, 10 and 11 have the same waveform and frequency, but relatively differ in phase by 120°. The period of these pulses is equal to three times the line period $T_1$, which is the period during which the colour television signal writes a line on the screen of a colour display tube. Pulse 12 has a period $T_0$ which is equal to the time during which a field is written on the screen of a display tube. For the European 625-line system, $T_1$ and $T_0$ are 64 μsecs. and 20 msecs. respectively, and for the NTSC 525-line system, $T_1$ and $T_0$ are 63.9 μsecs. and 16.6 msecs., respectively.

The pulse series 9, 10 and 11, which are relatively shifted in phase by 120°, are fed to the electronic switch 6 and switch it in such a manner that the red, green and blue colour components are fed successively to the lead 7, each during one line period $T_1$ of the colour television signal. A cycle is thus obtained in the time interval $3T_1$, during which the three colour components are alternately fed to the vertical deflection plates 4 each during one line period. The pulses 9 and 10 are also fed to a generator 13 and produce therein a step-like signal 14 having three levels each of a duration equal to one line period $T_1$.

The pulse 12 which has a period equal to the field period $T_0$, controls a sawtooth generator 15 on which a sawtooth signal 16 having a period $T_0$ is produced. The step-like signal 14 and the sawtooth signal 16 are added in a summating device 17, the superposition signal subsequently being fed to the horizontal deflection plates 5 through a lead 18 which may include an amplifier (not shown) if desired. The horizontal deflection plates 5 thus receive a field-frequency sawtooth voltage 16 having superimposed on it a periodical step-like voltage 14 of a comparatively high frequency equal to one third of the line frequency of the colour television signal.

The operation of the arrangement according to the invention will be clarified with reference to FIG. 2. FIG. 2*a* shows the screen 2 of cathode-ray tube 1, which is divided into three vertical strips R, G and B. The object of the arrangement according to the invention is to register in the said strips the red, green and blue colour components, respectively, of the colour television signal.

For a simple description of the invention the starting point is that, due to the voltages applied to the deflection plates the electron ray strikes the screen 2 at the beginning of each field period at point 1 in FIG. 2*a*.

If the sawtooth voltage 16 only of FIG. 2*b* is applied to the horizontal deflection plates 5, the electron ray will write as time-axis on the screen 2 from point 1 in the horizontal direction. The amplitude $V_0$ of the sawtooth voltage 16 has a value such that the time-axis is written only in the R-strip, FIG. 2*c*, shows again the stepwise voltage 14, which has a peak-to-peak value $2V_0$. The superposition of the sawtooth voltage 16 and the step-like voltage 14, which is fed through the lead 18 in FIG. 1 to the horizontal deflection plates 5, is shown in FIG. 2*d*. Since the step-like voltage 14 has a frequency which is comparatively high relative to that of the sawtooth voltage 16, the variation in the value of the low-frequency sawtooth 16 during the short time interval $T_1$ is negligible. A stepwise deflection of the electron ray in the horizontal direction is the result of the superposition voltage.

When starting from the instant $t=0$ and from a voltage $V=0$, the electron ray strikes the screen 2 at point 1 in the time interval (0 to $T_1$). Next the electron ray jumps to point 3 and remains there in the interval ($T_1$ to $2T_1$), whereafter it jumps to point 5 and remains there during the interval ($2T_1$ to $3T_1$). Subsequently the electron ray jumps back to point 7 and remains there during the interval ($3T_1$ to $4T_1$). The distance between point 1 and point 7 on the time-axis is determined by the increase in voltage of the sawtooth 16 during the time interval $3T_1$. The same applies to the distance between the points 7 and 13, 13 and 19, etc. A complete time-axis will have been written in the manner above described after a period $T_0$. The peak-to-peak value of the superposition voltage will be reached at the instant $T_0$ and then has the value $3V_0$.

In the arrangement the information for one line of a colour component of a colour television signal is fed to the vertical deflection plates 4 by means of direct current during each of the time intervals (0 to $T_1$), ($T_1$ to $2T_1$), ($2T_1$ to $3T_1$), etc. This information will cause deflection of the electron ray in the vertical direction so that a dash is written on the screen 2 during one line period. The length and the brightness of the dash are determined by the magnitude of the information during one line period and the kind of the information respectively.

As previously described, the information per line of a field of another colour component will be alternately fed to the vertical deflection plates 4. By the use of the interlacing principle a field of the colour television signal is built up of either odd or even lines. Each colour television signal is composed, in addition, of three colour components, which are simultaneously written on the screen of a display tube. The electronic switch 6 switches the red information of line 1 to the vertical deflection plates 4 during the interval (0 to $T_1$), then the green information of line 3 during the interval ($T_1$ to $2T_1$), then the blue information of line 5 during the interval ($2T_1$ to $3T_1$) and then again the red information of line 7 during the interval ($3T_1$ to $4T_1$), etc. The lines 1, 3, 5, 7 . . . correspond to the aforementioned points 1, 3, 5, 7 . . . in FIGS. 2*a* and 2*d*. Dependent upon the magnitude of the information per line, these points will change to the vertical dashes which are determined by the values of this information.

The field with odd lines has been written on the screen 2 after a period $T_0$, the strips R, G and B each having received one third of the number of lines per field, that is to say one sixth, of the number of lines per frame. The whole number of lines of a frame has been written in a strip R, G or B after six field periods or three frame periods. By the method above described, a flickerless image is obtained on the screen 2 of cathode-ray tube 1.

FIG. 3 shows a more detailed embodiment of the block diagram of FIG. 1, the blocks and signals shown in FIG. 1 being indicated by the same reference numerals in FIG. 3. Of the line and field-synchronizing pulses, applied to terminal S, the field-synchronizing pulses provide the pulse 12 through an integrating network 19 and a limiter stage 19', pulse 12 producing in sawtooth generator 15 the sawtooth signal 16 which is fed to the summating device 17. Sawtooth generator 15 is formed as a blocking oscillator and is of a known type so that the circuit is not shown in detail. The line synchronizing pulses are fed through a differentiating network 20 to the input of a first binary divider 21. Such a divider having two outputs which provide uniform pulse series of opposite polarities, is supposed to be sufficiently known to show the circuit merely as a block. One output of divider 21 is connected to the input of a second binary divider 22. An output signal from the second divider 22 is backcoupled to the first divider 21. This back-coupling results in a circuit known per se, by which pulse series 9, 10 and 23, 24 are produced having a frequency which is one third of the line frequency.

Three pulse series must be available for operating the electronic switch 6. The pulse series 25 which is missing with the pulse series 23 and 24 for the switch 6 is formed from the pulse series 9, 10 by means of an adding circuit 26.

The pulse series 9 and 10 are fed to the generator 13 for producing the step-like signal 14. Generator 13 includes a pnp-type transistor 27 the emitter of which is connected through a resistor 28 to the positive terminal of a voltage source the negative terminal of which is connected to ground. Its collector is connected to ground through a resistor 29. A Zener diode 30 is placed between the positive terminal of the voltage source and the base of the pnp-transistor 27, its base being connected to ground through a resistor 31. Due to the voltage of constant value set up across the Zener diode 30, the current flowing through resistor 28 will have a constant value independent of any signals still to be fed to the emitter.

Pulse 9 is fed through a resistor 32 to the base of a npn-type transistor 33. The emitter of transistor 33 is connected to ground and its collector is connected through a resistor 34 to the emitter of transistor 27. Pulse 10 is fed to a similar circuit having a npn-type transistors 35, except that the collector of transistor 35 is connected to the collector of transistor 33 through a resistor 36 which is equivalent to resistor 34. The positively directed pulse 9 makes transistor 33 conducting during one line period $T_1$ so that the collector of said transistor is brought substantially to ground potential. The constant current flowing through resistor 28 will be divided between the resistors 34 and 29 during its flow to ground. A current of low value then flows through resistor 29, the voltage drop across resistor 29 being a minimum so that the first level of the step-like signal 14 is formed. During a subsequent line period, transistor 33 will no longer conduct but the positively directed pulse 10 makes transistor 35 conducting during this period. The constant current flowing through resistor 28 is now divided between the series combination of the resistors 34 and 36 and over resistor 29. Consequently a current now flows through resistor 29 which is greater than in the previous case. The voltage drop across resistor 29 is thus greater so that the second level of signal 14 is formed. During a third subsequent line period $T_1$, both transistors 33 and 35 are cut off, so that the constant current in resistor 28 flows completely through resistor 29. The current in resistor 29 then has reached its maximum value and hence also the voltage drop across it so that the third level of the step-like signal 14 is obtained. After these three line periods, a new cycle starts. A step-like voltage 14 is thus developed across resistor 29, which has three levels each of a duration equal to one line period.

The sawtooth voltage 16 amplified by a pnp-type transistor 37 is developed in the summating device 17 likewise through resistor 29 so that the superposition voltage on line 18 appears.

The arrangement according to the invention has been described hereinbefore for the case that it is desired to observe three colour components of the colour television signal simultaneously on the screen 2 of cathode-ray tube 1. It will be evident that the described method is usable for any arbitrary number of components. If it is desired to observe simultaneously for example, three colour components and a brightness component of a colour television signal on the screen 2, the field frequency sawtooth voltage is given an amplitude which can write on only one quarter of the horizontal axis, the time-axis, on the screen 2, while a step-like voltage must be used having four levels each of a duration equal to one line period. The frequency of the step-like voltage will then be one quarter of the line frequency, and the difference between two levels is equal to the amplitude of the sawtooth voltage, which is required in this case.

It will also be evident, that the method above described can also satisfactorily be used for simultaneously testing a plurality of television signals from various cameras for which the synchronising pulses in the television signals occur at equal instants such as, for example, in reporter cars and studios.

What is claimed is:

1. A monitor system for a plurality of television signals having common line and field frequencies, comprising a source of said signals, display means, commutating means connected to apply said television signals in a predetermined sequence for durations of single lines of said signals, a source of a sawtooth signal of field frequency, a source of a stepwave signal having a period equal to the period of said sequence and having steps with durations equal to said line durations, means for adding said stepwave signal to said sawtooth signal, and means applying said added stepwave and sawtooth signals to said display means, whereby said display means displays information in series of adjacent zones corresponding to different television signals.

2. A monitor system for simultaneously displaying separable components of a television signal of the type having a plurality of simultaneously occurring separable components, said system comprising a source of said television signal, a display device of the type having a screen and first and second deflection means for deflecting a display in orthogonal directions on said screen, commutating means connected to apply said television signal to said first deflection means, a source of a sawtooth waveform signal having a frequency equal to the field frequency of said television signal, a source of a step wave signal having a period equal to the duration of a predetermined number of lines of said television signal and steps of the duration of a line of said television signal, and means connected to add said sawtooth signal and stepwave signal and to apply the sum thereof to said second deflection means, said commutating means comprising means for applying said components to said first deflection means in a predetermined sequence for durations equal to the durations of single lines of said television signal.

3. The system of claim 2 wherein said stepwave signal has *n* steps, wherein *n* is an integer greater than unity, and wherein said source of said stepwave signal comprises *n* transistors, one of said transistors being of the opposite conductivity of the remaining ($n$–1) transistors, a source of operating potential having first and second terminals, Zener diode means connected between said first terminal and the base of said one transistor, a first resistor connected between said base of said one transistors and said second terminal, second and third resistors connected between the emitter and collector of said one transistor and said first and second terminals respectively, means connecting the emitters of said ($n$–1) transistors to said second terminal, resistor means interconnecting the collectors of said ($n$–1) transistors, a fourth resistor connected between the collector of one of said ($n$–1) transistors and the collector of said first mentioned one transistor, ($n$–1) sources of separately occurring pulses of durations of a lined period, and means applying said ($n$–1) pulses to the bases of said ($n$–1) transistors respectively.

References Cited

UNITED STATES PATENTS

| | | | |
|---|---|---|---|
| 2,668,188 | 2/1954 | Naslund | 178—6 X |
| 2,828,355 | 3/1958 | Luther | 178—6 X |

RICHARD A. FARLEY, *Primary Examiner.*

T. H. TUBBESING, *Assistant Examiner.*

U.S. Cl. X.R.

178—5.4; 315—26